United States Patent
Obayashi et al.

(10) Patent No.: US 12,552,264 B2
(45) Date of Patent: Feb. 17, 2026

(54) VEHICLE AND CONTROL METHOD OF VEHICLE

(71) Applicant: KAWASAKI MOTORS, LTD., Hyogo (JP)

(72) Inventors: Kosuke Obayashi, Hyogo (JP); Yusuke Doi, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 89 days.

(21) Appl. No.: 18/413,600

(22) Filed: Jan. 16, 2024

(65) Prior Publication Data
US 2025/0229644 A1    Jul. 17, 2025

(51) Int. Cl.
*B60L 15/20* (2006.01)

(52) U.S. Cl.
CPC ....... *B60L 15/2036* (2013.01); *B60L 2240/22* (2013.01); *B60L 2240/421* (2013.01)

(58) Field of Classification Search
CPC ............. B60L 15/2036; B60L 2240/22; B60L 2240/421; B60L 3/10; B60L 3/102; B62D 11/04; B62D 11/003
See application file for complete search history.

(56) References Cited

U.S. PATENT DOCUMENTS

| | | | | |
|---|---|---|---|---|
| 6,202,773 B1* | 3/2001 | Richey | ................... | B60L 15/20 701/72 |
| 6,704,622 B2* | 3/2004 | Tinskey | ................ | B60T 8/1755 701/1 |
| 6,789,640 B1* | 9/2004 | Arling | .................... | B60L 50/51 180/218 |
| 6,909,959 B2* | 6/2005 | Hallowell | ............ | B60W 30/02 701/91 |
| 2016/0236589 A1* | 8/2016 | Sikand | ................ | B60L 15/2036 |
| 2017/0120755 A1* | 5/2017 | Ito | ............. | B60L 3/10 |

FOREIGN PATENT DOCUMENTS

JP    6479627    3/2019

* cited by examiner

*Primary Examiner* — George C Jin
(74) *Attorney, Agent, or Firm* — Wenderoth, Lind & Ponack, L.L.P.

(57) ABSTRACT

A vehicle includes a controller that calculates left command rotational speed and a right command rotational speed based on a target rotational speed difference that is a difference between a first target parameter and a second target parameter. The controller sets the left and the right command rotational speeds respectively to the left and the right target rotational speeds when the target rotational speed difference is equal to or less than a predetermined value, and sets the left command rotational speed or the right command rotational speed to an rotational speed different from the corresponding target rotational speed so that a command rotational speed difference that is a difference between a first command parameter regarding the left command rotational speed and a second command parameter regarding the right command rotational speed becomes the predetermined value when the target rotational speed difference exceeds the predetermined value.

14 Claims, 6 Drawing Sheets

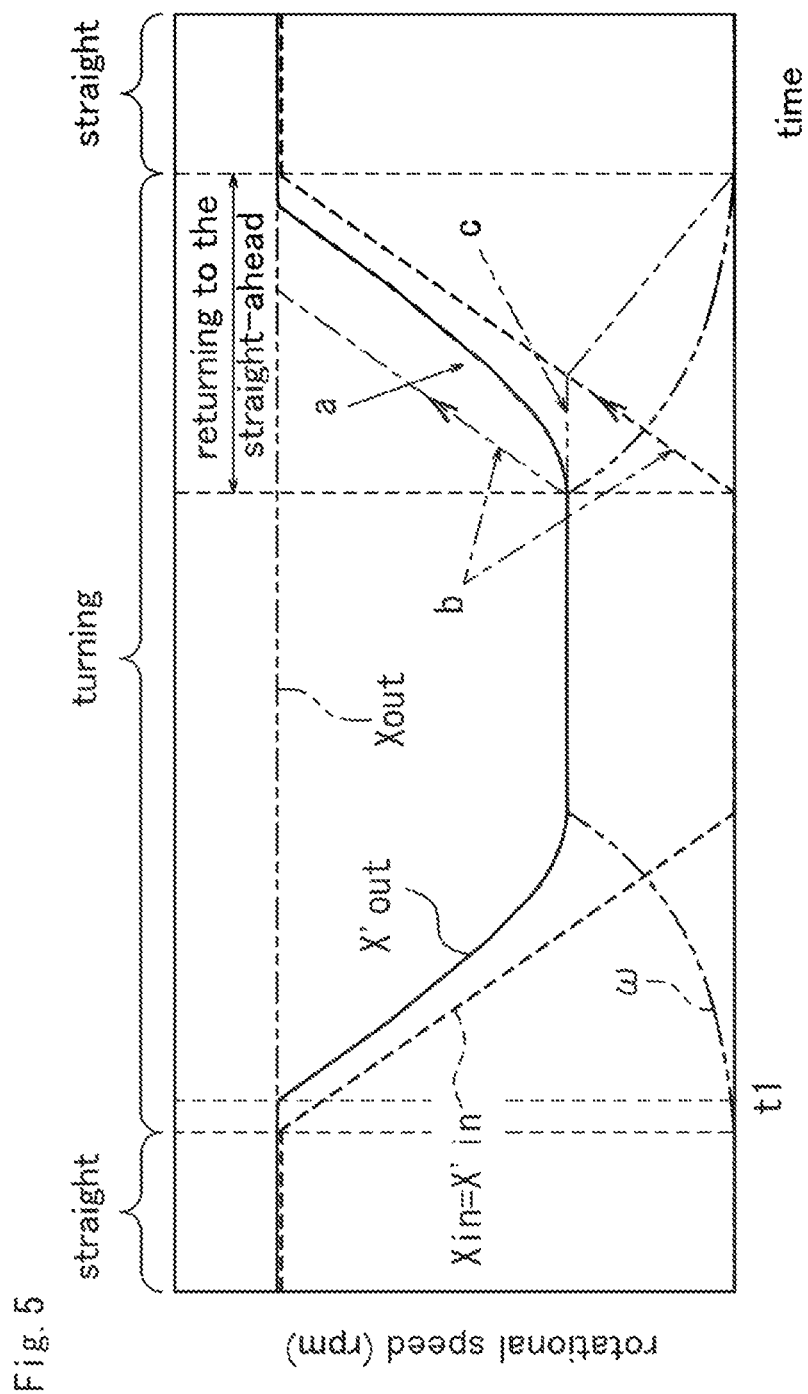

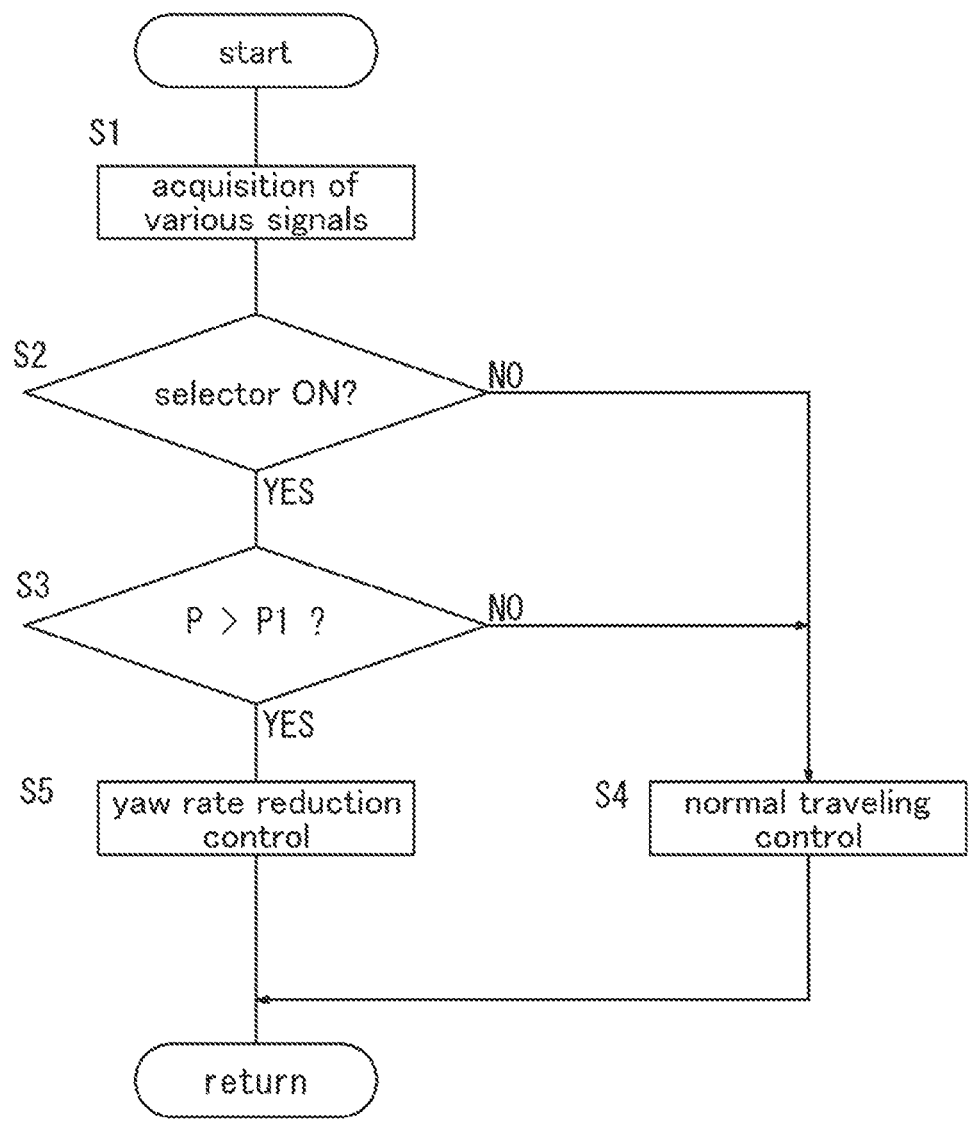

VEHICLE AND CONTROL METHOD OF VEHICLE

BACKGROUND OF THE INVENTION

Technical Field

The present disclosure relates to a vehicle and a control method of a vehicle.

Related Art

JP 6479627 B discloses an electric work vehicle that changes a direction by making a difference in revolutions per minute between a left drive wheel and a right drive wheel. In the electric work vehicle of JP 6479627 B, the occurrence of slip is determined based on a detected yaw rate of a traveling vehicle and a calculated yaw rate of the traveling vehicle.

SUMMARY

However, this type of electric work vehicle has room for improvement in reducing the deviation from a target line at a time of returning from a turning state to a straight-ahead state.

An object of the present disclosure provides a vehicle and a control method of a vehicle capable of reducing a deviation from a target line at a time of returning from a turning state to a straight-ahead state.

The present disclosure provides a vehicle including: a vehicle body; a drive source provided in the vehicle body; a left drive wheel and a right drive wheel that receive a drive force from the drive source, are supported by the vehicle body, and are rotationally controlled independently of each other; left and right manipulators that are operated by an operator to control rotational speed of the left drive wheel and the right drive wheel, respectively; and a controller that calculates a first target parameter and a second target parameter based on operation information about the left and right manipulators, the first target parameter being related to a left target rotational speed of the left drive wheel, the second target parameter being related to a right target rotational speed of the right drive wheel, calculates a left command rotational speed output to the left drive wheel and a right command rotational speed output to the right drive wheel based on a target rotational speed difference that is a difference between the first target parameter and the second target parameter, and controls the left drive wheel with the left command rotational speed and the right drive wheel with the right command rotational speed, in which the controller sets the left command rotational speed and the right command rotational speed respectively to the left target rotational speed and the right target rotational speed in a case where the target rotational speed difference is equal to or less than a predetermined value, and in a case where the target rotational speed difference exceeds the predetermined value, sets one of the left command rotational speed and the right command rotational speed to a rotational speed different from a corresponding target rotational speed which corresponds to the one of the left command rotational speed and the right command rotational speed so that a command rotational speed difference become the predetermined value, the command rotational speed difference being a difference between a first command parameter related to the left command rotational speed and a second command parameter related to the right command rotational speed.

According to the present disclosure, for example, the predetermined value of the target rotational speed difference is set to reduce a yaw rate of the vehicle and any one of the left command rotational speed and the right command rotational speed is made to be a rotational speed different from a corresponding target rotational speed, thus reducing the command rotational speed difference. This makes it possible to reduce the deviation from the target line at the time of returning from the turning state to the straight-ahead state.

BRIEF DESCRIPTION OF THE DRAWINGS

The foregoing and the other features of the present disclosure will become apparent from the following description and drawings of an illustrative embodiment of the disclosure in which:

FIG. 5 is a graph illustrating a time variation of change of a target rotational speed during yaw rate reduction control; and FIG. 6 is a flowchart illustrating an example of an operation of the controller.

DETAILED DESCRIPTION OF EMBODIMENTS

Figure 1:
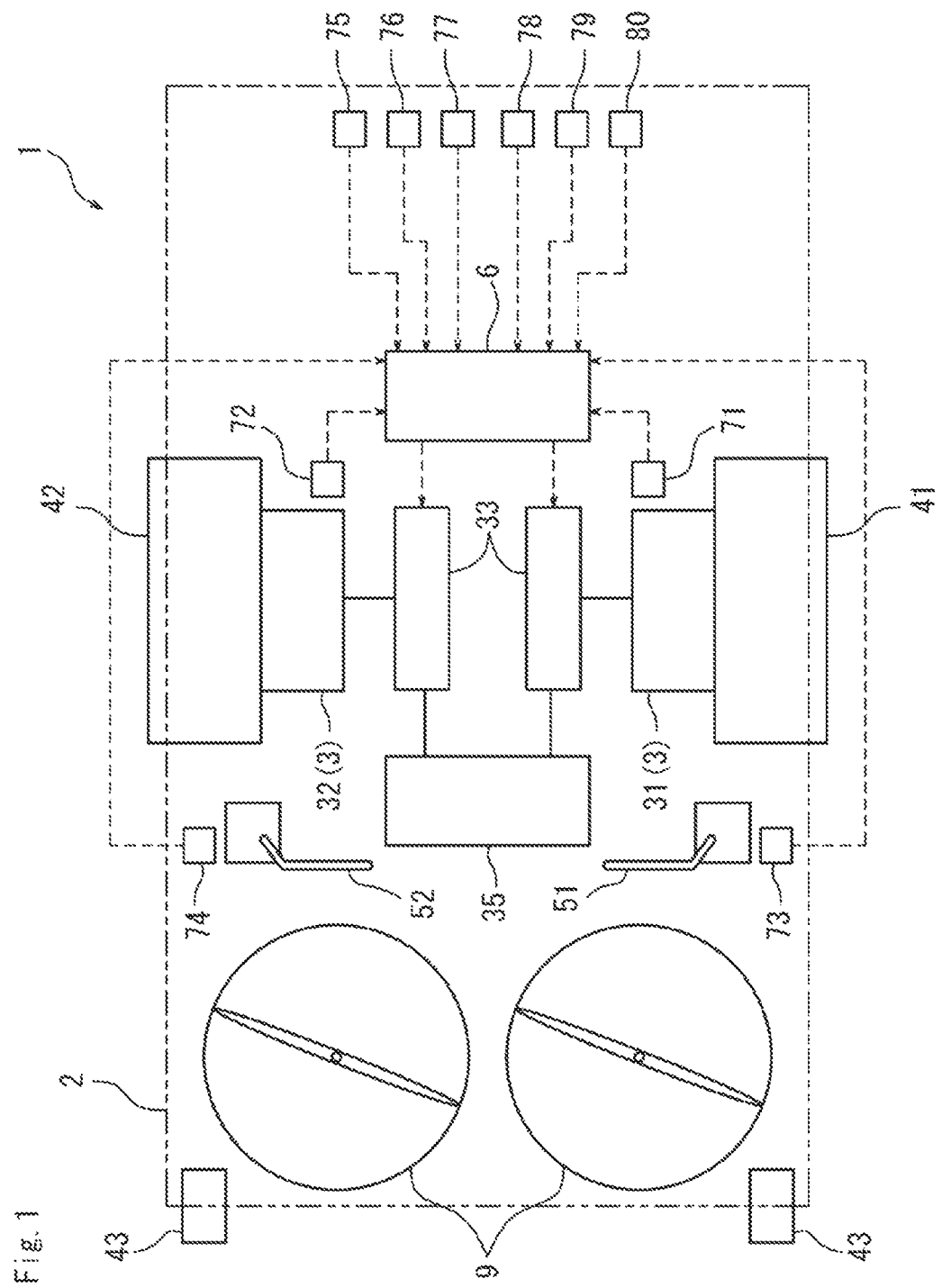
FIG. 1 is a schematic configuration diagram of a lawn mower including a controller of a vehicle according to the present disclosure.

FIG. 1 is a schematic configuration diagram of a lawn mower (hereinafter, also referred to as a "vehicle") 1 as a vehicle according to an embodiment of the present disclosure. In the present specification, "front", "rear", "left", and "right" correspond respectively to a front direction, a rear direction, a left direction, and a right direction as viewed from a driver in the vehicle. The vehicle may be a vehicle, such as a lawn mower, in which left and right drive wheels are independently driven.

A lawn mower 1 illustrated in FIG. 1 includes a vehicle body 2, a drive source 3 provided in the vehicle body 2, a left drive wheel 41 and a right drive wheel 42 supported by the vehicle body 2, inverters 33 and a battery 35 that operate the left and right drive wheels 41 and 42, left and right manipulators 51 and 52 operated by an operator (driver), and a controller 6 that controls traveling of the vehicle 1.

The lawn mower 1 further includes a pair of left and right front wheels 43 that are a caster type and are disposed forward of the left and right drive wheels 41 and 42, respectively, and a lawn mowing unit 9 that is suspended in a space below the vehicle body 2 between the pair of left and right front wheels 43 and the left and right drive wheels 41 and 42.

In order to control the traveling of the vehicle, the lawn mower 1 includes left and right rotational speed (revolutions-per-minute, RPM) sensors 71 and 72 that respectively detect the RPMs (rotational speeds) of the drive wheels 41 and 42, left and right operation amount sensors 73 and 74 that respectively detect the operation amounts of left and right manipulators 51 and 52, a mowing blade switch 75 for turning on or off the operation of the lawn mowing unit 9, and a selector 80 for turning on or off a reduction mode of the RPMs of drive wheels 41 and 42 during turning.

The lawn mower 1 may further include a vehicle speed sensor 76 that detects the traveling speed of the vehicle 1, a yaw rate sensor 77 that detects the yaw rate of the vehicle 1, a tilt sensor 78 that detects the tilt of the vehicle body 2 with respect to a horizontal line, and a load weight detector 79 that detects the weight of a load mounted on the vehicle 1.

The drive source 3 includes a left motor 31 that supplies a drive force to the left drive wheel 41, and a right motor 32 that supplies a drive force to the right drive wheel 42. The left motor 31 and the right motor 32 each receive electric power from the battery 35 via the inverters 33 connected to the respective motors. The drive source 3 may be an engine instead of the motor, or may include both the engine and the motor.

The manipulators 51 and 52 include a left manipulator 51 that controls the RPM of the left drive wheel 41 and a right manipulator 52 that controls the RPM of the right drive wheel 42. When the left and right manipulators 51 and 52 are operated by the operator, the RPMs of the left drive wheel 41 and the right drive wheel 42 are controlled in accordance with the operation amounts of the manipulators 51 and 52. In the present embodiment, the left and right manipulators 51 and 52 are levers that are swingable in a front-rear direction on a side portion of a driver's seat.

A target rotational speed is 0 rpm in a state where the left and right manipulators 51 and 52 extend in a vertical direction (neutral state). As the left and right manipulators 51 and 52 are tilted forward or backward, the target rotational speeds increase and the drive wheels 41 and 42 turn at a higher speed. When the manipulators 51 and 52 are tilted forward, the drive wheels 41 and 42 turn forward (in a turning direction toward the front side of the vehicle), and when the manipulators 51 and 52 are tilted backward, the drive wheels 41 and 42 turn backward (in a turning direction toward the rear side of the vehicle).

Figure 2:
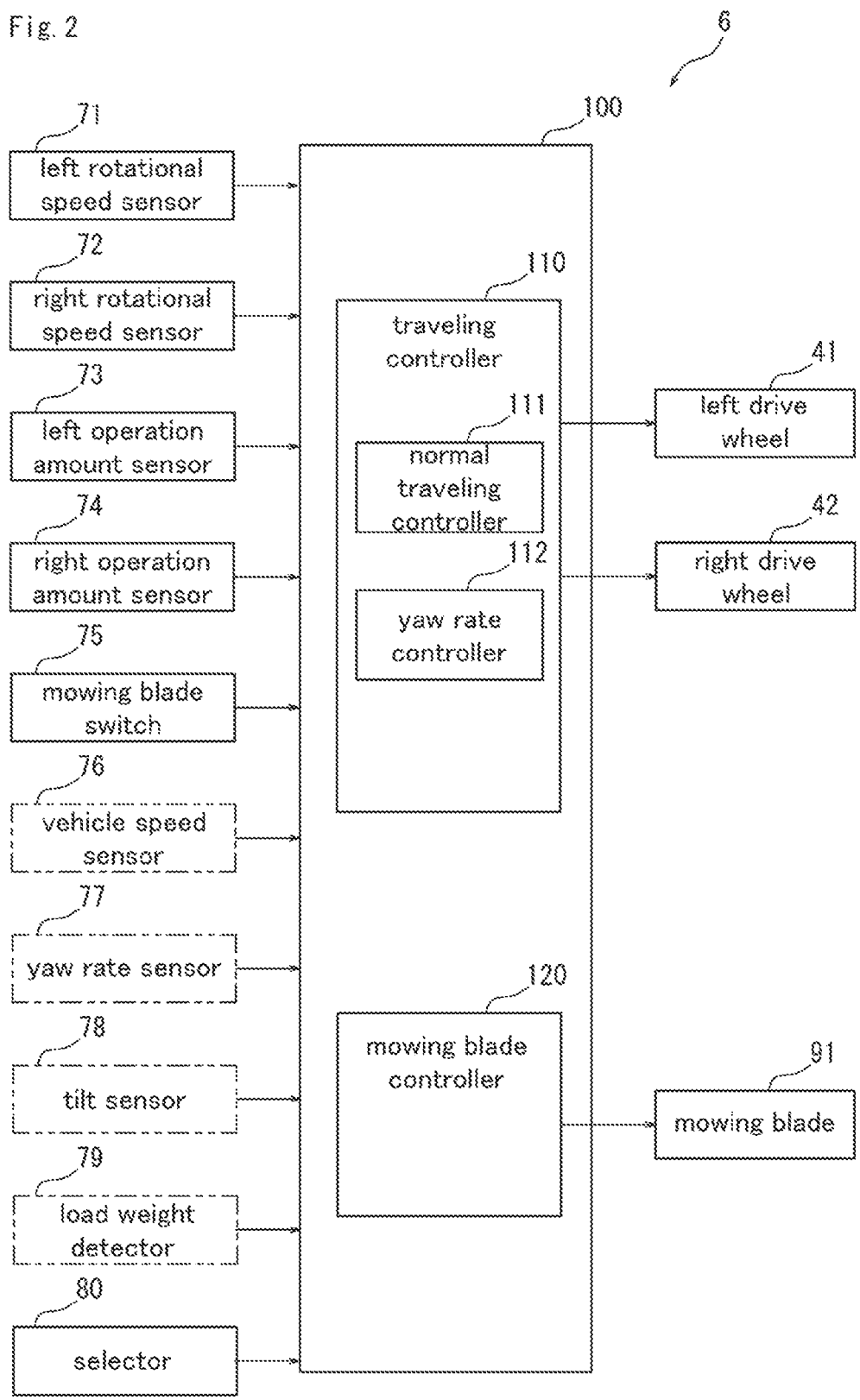
FIG. 2 is a system diagram of the controller of the vehicle according to the present disclosure.

As illustrated in FIG. 2, the controller 6 of the vehicle includes a control unit 100 that performs various controls of the vehicle. The control unit 100 includes, for example, a microprocessor as a main part. The control unit 100 includes a central processing unit (CPU), a memory including, for example, a random access memory (RAM) and a read only memory (ROM), and an input-output interface circuit.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Various external signals used for controlling the vehicle 1 are input to the control unit 100. In the present embodiment, the control unit 100 receives detection signals from the left and right operation amount sensors 73 and 74, the mowing blade switch 75, and the selector 80.

The control unit 100 may further receive detection signals from the left and right rotational speed sensors 71 and 72, the vehicle speed sensor 76, the yaw rate sensor 77, the tilt sensor 78, and the load weight detector 79.

The control unit 100 includes a traveling controller 110 that controls traveling of the vehicle 1, and a mowing blade controller 120 that controls an operation of the lawn mowing unit 9.

The traveling controller 110 constantly calculates a first target parameter Pa and a second target parameter Pb based on detection values from various sensors including operation information about the left and right manipulators 51 and 52. The first target parameter Pa is related to a left target rotational speed of the left drive wheel 41. The second target parameter Pb related to a right target rotational speed of the right drive wheel 42. The traveling controller 110 calculates a left command rotational speed output to the left drive wheel 41 and a right command rotational speed output to the right drive wheel 42, based on a target rotational speed difference P that is the difference between the calculated first target parameter Pa and second target parameter Pb.

The traveling controller 110 includes a normal traveling controller 111 that controls normal traveling in a case where the target rotational speed difference P is equal to or less than a predetermined value P1, and a yaw rate controller 112 that reduces a yaw rate ω of the vehicle in a case where the target rotational speed difference P exceeds the predetermined value P1. The yaw rate ω is an angular velocity of turning around a vertical axis passing through the center of gravity of the vehicle 1. Details of the normal traveling controller 111 and the yaw rate controller 112 will be described later.

Figure 3:
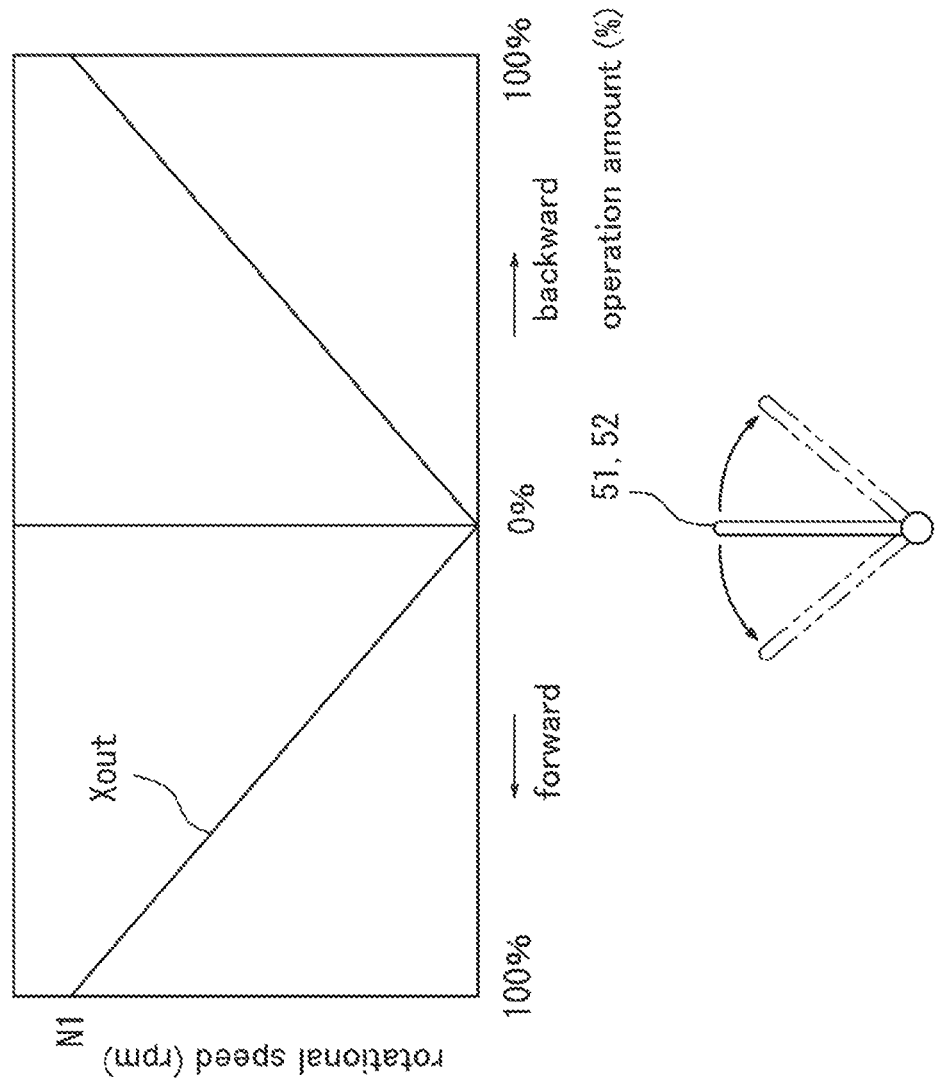
FIG. 3 is a graph illustrating a relationship between operation amounts of manipulators and a target rotational speed (revolutions-per-minute, RPM) of drive wheels.

The traveling controller 110 determines the left target rotational speed and the right target rotational speed based on the positions of the manipulators 51 and 52 detected respectively by the operation amount sensors 73 and 74, and a map of the target rotational speeds with respect to the operation amounts stored in the control unit 100 (see FIG. 3).

Here, the relationships between the operation amounts of the manipulator 51 and the left target rotational speed and between the operation amount of the manipulator 52 and the right target rotational speed will be described. FIG. 3 illustrates the relationship between the operation amounts of the manipulators 51 and 52 and the target rotational speeds of the drive wheels 41 and 42. In the graph of FIG. 3, the vertical axis represents the target rotational speeds of the drive wheels 41 and 42, and the horizontal axis represents the operation amounts of the manipulators 51 and 52. As illustrated in FIG. 3, the target rotational speed is 0 rpm when the operation amount of each of the manipulators 51 and 52 is 0%, and the target rotational speed is N1 (rpm) when the operation amount is 100%. In the present embodiment, the target rotational speed is set to be proportional to the operation amount.

In a state where the manipulators 51 and 52 extend in the vertical direction, the operation amount is 0%, and in a state where the manipulators are tilted toward a frontmost position or a rearmost position, the operation amount is 100%. The target rotational speed of each of the drive wheels 41 and 42 is set based on such a relationship. The relationships between the operation amounts of the manipulators 51 and 52 and the target rotational speeds of the drive wheels 41 and 42 illustrated in FIG. 3 may be stored as a map in the control unit 100.

Each of the operation amount sensors 73 and 74 may respectively detect the rotational angles of the manipulators 51 and 52. The traveling controller 110 may set the target rotational speed of each of the drive wheels 41 and 42 in accordance with the time variation of change (operation speed) of the operation amount. For example, the target rotational speed may be proportional to the operation speed of the manipulators 51 and 52.

Prior to the description of the normal traveling controller 111 and the yaw rate controller 112, the relationship between the yaw rate ω and the rotational speed of each of the drive wheels 41 and 42, and the relationship between a centrifugal force F and the rotational speed of each of the drive wheels 41 and 42 will be described with reference to FIG. 4.

Figure 4:
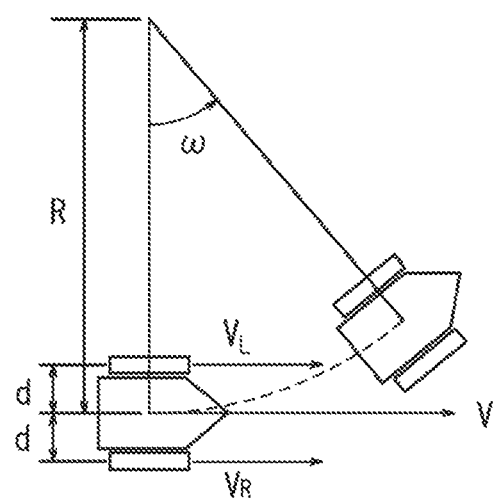
FIG. 4 is an explanatory diagram of a yaw rate and a centrifugal force applied to the vehicle.

As illustrated in FIG. 4, when the moving speed of the vehicle 1 is V, the rotational speeds of the left and right drive wheels 41 and 42 are $V_R$ and $V_L$, the turning angular velocity (yaw rate) is ω, a turning radius is R, the distances between a vehicle center and the wheels are d, a vehicle weight is m, and the centrifugal force is F, the relationship between the rotational speed difference between the left and right drive wheels 41 and 42 during the turning, the yaw rate ω, and the centrifugal force F is defined by the following theoretical expression.

$$V = R\omega \quad \text{[Mathematical expression 1]}$$
$$V_L = (R - d)\omega$$
$$V_R = (R + d)\omega$$
$$V = (V_L + V_R)/2$$
$$\omega = (V_R - V_L)/2d$$
$$F = mR\omega^2 = mV\omega$$

From Mathematical expression 1, the yaw rate ω and the centrifugal force F increases as the speed difference (rotational speed difference) between the inner and outer drive wheels (in FIG. 4, the inner drive wheel is the left drive wheel 41, and the outer drive wheel is the right drive wheel 42) during the turning is greater. Thus, it is preferable to reduce the rotational speed difference between the inner and outer drive wheels 41 and 42 in order to reduce the yaw rate ω and the centrifugal force F.

The normal traveling controller 111 makes normal traveling control in a case where the target rotational speed difference P calculated by the traveling controller 110 is equal to or less than the predetermined value P1. The normal traveling controller 111 sets the left command rotational speed and the right command rotational speed respectively to the left target rotational speed and the right target rotational speed.

Specifically, the target rotational speed difference P is a difference between the first target parameter Pa and the second target parameter Pb. The first target parameter is a power n of a target rotational speed $X_{out}$ of the outer drive wheel (right drive wheel in FIG. 4) 42 and the second target parameter is a power n of a target rotational speed $X_{in}$ of the inner drive wheel (the left drive wheel in FIG. 4) 41 when the target RPM of the inner drive wheel 41 is represented by $X_{in}$ and the target rotational speed of the outer drive wheel 42 is represented by $X_{out}$. The target rotational speed difference P is expressed by the following Mathematical expression 2. Note that the target rotational speeds $X_{in}$ and $X_{out}$ of the inner and outer drive wheels 41 and 42 have a relationship between the operation amounts of the manipulators 51 and 52 and the target rotational speeds illustrated in FIG. 3.

$$P = X_{out}^n - X_{in}^n \quad \text{[Mathematical expression 2]}$$

In the present specification, the power n may be 1 or more. In other words, the target rotational speed difference P may be a difference between the target rotational speed of the left drive wheel 41 and the target rotational speed of the right drive wheel 42. The power n is preferably 2 or more, and is set to two in the present embodiment.

The predetermined value P1, which is an upper limit value of the target rotational speed difference P, is a value that satisfies "property of returning to a straight-ahead state" and "steering stability", and is preferably set so that 1800≤P1≤2250. In the present embodiment where the power n is set to two, for example, P1 is set to 1800. As the predetermined value P1, a result of sensory evaluation made by a driver may be adopted. The "returning to the straight-ahead state" means that during the turning, the target rotational speed of the inner drive wheel 41 is brought close to the target rotational speed of the outer drive wheel 42 and then become the target rotational speed of the outer drive wheel 42 (see FIG. 5).

In the present embodiment, the yaw rate controller 112 makes the yaw rate reduction control in a case where the target rotational speed difference P calculated by the traveling controller 110 exceeds the predetermined value P1. In the yaw rate reduction control, any one of the left command rotational speed and the right command rotational speed is made to be a rotational speed different from the left target rotational speed and the right target rotational speed.

The yaw rate controller 112 makes the command rotational speed of the outer drive wheel 42 (right command rotational speed) $X'_{out}$ to be a rotational speed different from the relationship with the target rotational speed of the outer drive wheel 42 (right target rotational speed) $X_{out}$ so that a command rotational speed difference P2 between a command rotational speed $X'_{in}$ output to the inner drive wheel 41 and a command rotational speed $X'_{out}$ output to the outer drive wheel 42 becomes the predetermined value P1 when the target rotational speed difference P between the inner drive wheel 41 and the outer drive wheel 42 becomes greater than or equal to the predetermined value P1.

The command rotational speed difference P2 between the left drive wheel 41 and the right drive wheel 42 is a difference between a first command parameter Pc and a second command parameter Pd. The first command parameter Pc is a power n of the right command rotational speed $X'_{out}$ of the outer drive wheel 42, and the second command parameter Pd is a power n of the left target RPM $X'_{in}$ of the inner drive wheel 41 at a time when the command rotational speed (left command rotational speed) of the inner drive wheel 41 is $X'_{in}$ and the command rotational speed (right command rotational speed) of the outer drive wheel 42 is $X'_{out}$. The command rotational speed difference P2 is expressed by the following Mathematical expression 3.

$$P2 = X_{out}^m - X_{in}^m \quad \text{[Mathematical expression 3]}$$

In the present specification, the power n may be 1 or more. In other words, the target rotational speed difference P may be a difference between the target rotational speed of the left drive wheel 41 and the target rotational speed of the right drive wheel 42. The power n is preferably 2 or more, and is set to two in the present embodiment.

The right command target rotational speed $X'_{out}$ is controlled based on the following Mathematical expression 4 as illustrated in FIG. 5. Note that the left command rotational speed $X'_{in}$ of the inner drive wheel 41 have a relationship between the operation amounts of the manipulators 51 and 52 and the target rotational speed $X_{in}$ in the normal traveling control illustrated in FIG. 3.

$$X'^2_{out} - X'^2_{in} = P1$$
$$X'_{in} = X_{in}$$
$$X'_{out} = (X^2_{in} + P1)^{1/2}$$

[Mathematical expression 4]

FIG. 5 illustrates the left target rotational speed $X_{in}$ of the inner drive wheel 41, the right target rotational speed $X_{out}$ of the outer drive wheel 42, the time variation of change of the right command rotational speed $X'_{out}$, and the time variation of change of the yaw rate ω. As for the inner drive wheel 41, the left command rotational speed $X'_{in}$ becomes the left target rotational speed $X_{in}$. In the graph of FIG. 5, the vertical axis represents the rotational speeds of the drive wheels 41 and 42, and the horizontal axis represents time.

As illustrated in FIG. 5, the yaw rate reduction control is made at time t1 when the command rotational speed $X'_{in}$ (target rotational speed $X_{in}$) of the inner drive wheel 41 approaches 0 and the target rotational speed difference P becomes greater than or equal to the predetermined value P1 in accordance with the operation amount of the left manipulator 51. The yaw rate controller 112 controls the rotational speed of the outer drive wheel 42 based on the command rotational speed $X'_{out}$ calculated in the Mathematical expression 4 with the operation amount of the right manipulator 52 in the straight-ahead state being maintained.

More specifically, at time t1 when the target rotational speed difference P between the left and right drive wheels 41 and 42 becomes greater than or equal to the predetermined value P1, the yaw rate controller 112 reduces the right command rotational speed $X'_{out}$ of the outer drive wheel 42 of the left drive wheel 41 and right drive wheel 42 so that this right command rotational speed is lower than the right target rotational speed $X_{out}$. The outer drive wheel 42 is positioned on the outer-wheel-side during the turning.

As a result, as illustrated in FIG. 5, since the outer drive wheel 42 is controlled based on the right command rotational speed $X'_{out}$ lower than the right target rotational speed $X_{out}$, the rotational speed difference between the inner drive wheel 41 and the outer drive wheel 42, that is, the yaw rate ω of the vehicle 1 is reduced as compared with the case where the inner drive wheel 41 and the outer drive wheel 42 turn at the left and right target rotational speeds $X_{in}$ and $X_{out}$.

The selector 80 can perform switching between a reduction mode in which the upper limit value P1 of the parameter P related to the rotational speed difference between the left drive wheel 41 and the right drive wheel 42 is set and a reduction release mode in which the upper limit value P1 of the parameter P related to the rotational speed is not set. The driver can select any mode using the selector 80. In the present embodiment, the yaw rate reduction control is made in a case where the selector 80 is on, and the yaw rate reduction control is not made in a case where the selector 80 is off.

The mowing blade controller 120 outputs a control signal to the lawn mowing unit 9 based on detection values from various sensors including the mowing blade switch 75 to make the mowing blade control for controlling the rotational speed of mowing blades 91 and controlling the mowing blades 91 of the lawn mower.

Examples of the operations of the normal traveling control and the yaw rate reduction control will be described more specifically with reference to the flowchart of FIG. 6.

The control operation illustrated in FIG. 6 is started while the vehicle 1 is traveling. In step S1 of FIG. 6, various signals are input to the control unit 100. In step S2, a determination is made whether the selector 80 is on. In the case where the selector 80 is on, the processing proceeds to step S3. In the case where the selector 80 is off, the processing proceeds to step S4 to make the normal traveling control, and the flow is returned.

In step S3, the left target rotational speed and the right target rotational speed of the left and right drive wheels 41 and 42 are respectively calculated based on the operation amounts of the left and right manipulators 51 and 52 acquired in step S1 or acquired from a map. Thereafter, the target rotational speed difference P, which is a difference between the square of the left target rotational speed as the first target parameter Pa and the square of the right target rotational speed as the second target parameter Pb, is calculated. A determination is made whether the calculated target rotational speed difference P exceeds the predetermined value P1. In other words, a determination is made whether the target rotational speed difference $P=(X_{out}^2 - X_{in}^2)$ exceeds the predetermined value P1=1800. In a case where the parameter P related to the target rotational speed difference is equal to or less than the predetermined value P1, the processing proceeds to step S4, the normal traveling control is made, and the flow is returned. In a case where a determination is made that the target rotational speed difference P exceeds the predetermined value P1, the processing proceeds to step S5, the yaw rate reduction control is made, and the flow is returned.

The vehicle and the vehicle control method according to the above embodiment produce the following effects.

One aspect of the present disclosure provides the vehicle 1 includes:
the vehicle body 2;
the drive source 3 having the vehicle body 2;
the left drive wheel 41 and the right drive wheel 42 that receive a drive force from the drive source 3, are supported by the vehicle body 2, and are rotationally controlled independently of each other;
the left and right manipulators 51 and 52 that are operated by an operator to respectively control the rotational speeds of the left drive wheel 41 and the right drive wheel 42; and
the controller 6 that calculates the first target parameter and the second target parameter based on operation information about the left and right manipulators 51 and 52, the first target parameter being related to a left target rotational speed of the left drive wheel 41, the second target parameter being related to the right target rotational speed of the right drive wheel 42, calculates the left command rotational speed output to the left drive wheel 41 and the right command rotational speed output to the right drive wheel 42 based on the target rotational speed difference P that is the difference between the first target parameter and the second target parameter, and controls the left drive wheel 41 with the left command rotational speed and the right drive wheel 42 with the right command rotational speed,
in which the controller 6
sets the left command rotational speed and the right command rotational speed to the left target rotational speed and the right target rotational speed in a case where the target rotational speed difference P is equal to or less than the predetermined value P1, and
in a case where the target rotational speed difference P exceeds the predetermined value P1, sets any one of the left command rotational speed and the right command rotational speed to rotational speeds different respectively from the corresponding target rotational speed which corresponds to the one of the left command rotational speed and the right command rotational speed so that the command rotational speed difference P2 becomes the predetermined value P1, the command rotational speed difference P2 being the difference between the first command parameter related to the left command rotational speed and the second command parameter related to the right command rotational speed.

According to the present disclosure, for example, the predetermined value P1 of the target rotational speed difference P is set to reduce the yaw rate ω of the vehicle 1 and any one of the left command rotational speed and the right command rotational speed is made to be a rotational speed different from the corresponding target rotational speed, thus reducing the command rotational speed difference. This makes it possible to reduce the deviation from the target line at the time of returning to the straight-ahead state. Further, the rotational speeds of the left and right drive wheels 41 and 42 are controlled so that the centrifugal force F of the vehicle 1 is reduced during the turning. This makes it possible to reduce falling during the turning. Furthermore, since it is not necessary to limit the upper limit value of the traveling speed during the straight-ahead traveling in consideration of the turning time, desired turning performance can be obtained without lowering the traveling speed.

When the target rotational speed difference P exceeds the predetermined value P1, the controller 6 reduces the command rotational speed of the outer drive wheel (right drive wheel) 42 of the left drive wheel 41 and the right drive wheel 42, the outer drive wheel being positioned on the outer-wheel-side during the turning, so that this command rotational speed is lower than the target rotational speed of the right drive wheel 42.

According to this configuration, since the command rotational speed difference P2 is reduced, it is easy to return to the intended traveling line at the time of returning to the straight-ahead state.

When the target rotational speed difference P exceeds the predetermined value P1, the controller 6 sets the command rotational speed of the left drive wheel 41 and the right drive wheel 42 so that this command rotational speed is equal to the target rotational speed of the left drive wheel 41. The left drive wheel is positioned on the inner-wheel-side during the turning.

According to this configuration, the ride of the driver can be improved more easily than a configuration where the command rotational speed of the inner drive wheel 41 is increased and the rotational speed difference is reduced. For example, even if the command rotational speed of the inner drive wheel 41 is heightened, the command rotational speed difference is reduced, and thus the yaw rate can be reduced. In this case, however, the vehicle speed increases during the turning, and the ride comfort may be degraded (the reduction of the centrifugal force is difficult and the vehicle easy falls).

The first target parameter is the power of the left target rotational speed, the second target parameter is the power of the right target rotational speed, the first command parameter is the power of the left command rotational speed, and the second command parameter is the power of the right command rotational speed.

According to this configuration, for example, by setting the power to the square or more, as indicated by an arrow a in FIG. 5, it is possible to make control so that the command rotational speed difference between the inner drive wheel 41 and the outer drive wheel 42 decreases while the vehicle 1 is returning to the straight-ahead traveling. In other words, the yaw rate ω at the time of returning to the straight-ahead traveling is reduced more than the yaw rate ω before the returning to the straight-ahead state. At the time of returning to the straight-ahead traveling, the turning recoverability is easily obtained by ending the turning while the yaw rate ω is being reduced more than the yaw rate ω during the turning before the returning to the straight-ahead state. Therefore, the above configuration makes it is possible, at the time of returning to the straight-ahead traveling, to reduce the discomfort to the driver caused when the yaw rate ω is not reduced as compared with the yaw rate before the returning to the straight-ahead state.

More specifically, in a case where the power is 1, a speed change of the outer drive wheel 42 become a speed change of the inner drive wheel 41 at the time of returning to the straight-ahead traveling as indicated by an arrow b in FIG. 5. Therefore, a yaw rate invariant region (arrow c) may be generated. Due to the yaw rate invariant region, the yaw rate ω is not reduced at the time of returning to the straight-ahead traveling as compared with before the returning to the straight-ahead state. Thus, the driver might feel uncomfortable.

Since the power is square, the above described effect can be obtained. Further, since the power is square, the centrifugal force can be reduced by setting the upper limit value P1 of the target rotational speed difference P. More specifically, since the centrifugal force is expressed by $F=m\,(V_R^2-V_L^2)/4d$ from the Mathematical expression 1, the centrifugal force can be reduced by setting the upper limit value P1 of the difference ($P2=X'_{out}{}^2-X'_{in}{}^2$) between the square of the right command rotational speed $X'_{out}$ of the outer drive wheel 42 and the square of the left target rotational speed $X'_{in}$ of the inner drive wheel 41.

The operation information may include the operation amount of the right and left manipulators 51 and 52 and/or time variation of change of the operation amounts.

With this configuration, the vehicle easily turns and travels in response to the operator's intention by assigning the revolving pattern corresponding to the operation speed and/or the operation amount of the left and right manipulators 51 and 52.

The selector 80 is provided to be capable of switching between the reduction mode in which the upper limit value of the target rotational speed difference P is set and the reduction release mode in which the upper limit value of the target rotational speed difference P is not set.

With this configuration, the selector 80 is capable of switching between the reduction mode and the reduction release mode, and thus the vehicle is easily caused to travel in accordance with the operator's intention.

The vehicle 1 is a lawn mower.

With this configuration, in lawn mower 1, since yaw rate ω and/or centrifugal force F of vehicle 1 during the turning are/is reduced, it is not necessary to limit the upper limit value of the traveling speed during the straight-ahead traveling in consideration of the turning. Therefore, desired turning performance can be easily obtained without reducing the traveling speed during the straight-ahead traveling. For example, the lawn mower 1 frequently turns and travels in a narrow area at the time of cutting turf. In this case, the turning performance and the reduction in falling are more important, and thus the reduction of the yaw rate ω or the centrifugal force F is more effectively exhibited.

An aspect of the present disclosure provides the control method for the vehicle 1, the vehicle 1 including
the vehicle body 2,
the drive source 3 having the vehicle body 2,
the left drive wheel 41 and the right drive wheel 42 that receive a drive force from the drive source 3, are supported by the vehicle body 2, and are rotationally controlled independently of each other,
the left and right manipulators 51 and 52 that are operated by an operator to respectively control the rotational speeds of the left drive wheel 41 and the right drive wheel 42, and
the controller 6 that calculates the first target parameter and the second target parameter based on operation information about the left and right manipulators 51 and 52, the first target parameter being related to a left target rotational speed of the left drive wheel 41, the second target parameter being related to the right target rotational speed of the right drive wheel 42, calculates the left command rotational speed output to the left drive wheel 41 and the right command rotational speed output to the right drive wheel 42 based on the target rotational speed difference P that is the difference between the first target parameter and the second target parameter, and controls the left drive wheel 41 with the left command rotational speed and the right drive wheel 42 with the right command rotational speed,
in which the controller 6
sets the left command rotational speed and the right command rotational speed to the left target rotational speed and the right target rotational speed in a case where the target rotational speed difference P is equal to or less than the predetermined value P1, and
in a case where the target rotational speed difference P exceeds the predetermined value P1, sets any one of the left command rotational speed and the right command rotational speed to a rotational speed different from the corresponding target rotational speed which corresponds to the one of the left command rotational speed and the right command rotational speed so that the command rotational speed difference P2 becomes the predetermined value P1, the command rotational speed difference P2 being the difference between the first command parameter related to the left command rotational speed and the second command parameter related to the right command rotational speed.

According to the present disclosure, for example, the predetermined value P1 of the target rotational speed difference P is set so that the yaw rate ω of the vehicle 1 is controlled, and one of the left command rotational speed and the right command rotational speed is made to be a rotational speed different from the corresponding target rotational speed, thus reducing the command rotational speed difference. This makes it possible to reduce the deviation from the target line at the time of returning from the turning state to the straight-ahead state. Further, the rotational speeds of the left and right drive wheels 41 and 42 are controlled so that the centrifugal force F of the vehicle 1 is reduced during the turning. This makes it possible to reduce falling during the turning. Furthermore, since it is not necessary to limit the upper limit value of the traveling speed during the straight-ahead traveling in consideration of the turning time, desired turning performance can be obtained without lowering the traveling speed.

Note that the vehicle and the vehicle control method of the present invention are not limited to the configurations of the above-described embodiment, and various modifications can be made.

The controller 6 may be controlled using another function so that the command rotational speed difference between the inner drive wheel 41 and the outer drive wheel 42 decreases while the target rotational speed of the inner drive wheel 41 approaches the target rotational speed of the outer drive wheel 42.

With this configuration, the command rotational speed difference between the inner drive wheel 41 and the outer drive wheel 42 is made to be decreased while the vehicle 1 is returning to the straight-ahead traveling. Therefore, the yaw rate ω at the time of returning to the straight-ahead traveling is reduced to be lower than the yaw rate w before the returning to the straight-ahead traveling. This makes it possible to, at the time of returning to straight-ahead traveling, reduce discomfort to the driver, such as a situation that the yaw rate ω is not lower than that during the turning.

The above embodiment has described the example where the controller 6 determines the upper limit value P1 of the target rotational speed difference P based on the result evaluated by the sensory evaluation by the driver and sets the command rotational speed of the outer drive wheel 42, but the present disclosure is not limited thereto. For example, the traveling controller 110 may determine the upper limit value P1 in accordance with the vehicle speed and set the command rotational speed of the outer drive wheel 42.

With this configuration, in a case where the vehicle speed is low, a decrease in the turning speed can be reduced by reducing the reduction rate of the command rotational speed of the outer drive wheel 42.

The above embodiment has described the example where the controller 6 determines the upper limit value P1 of the target rotational speed difference P based on the result evaluated by the sensory evaluation by the driver and sets the command rotational speed of the outer drive wheel 42, but the present disclosure is not limited thereto. For example, the traveling controller 110 may set the upper limit value P1 in accordance with the vehicle body tilt in the vehicle body width direction of the vehicle 1 detected by the tilt sensor 78.

With this configuration, overturning of the vehicle caused due to the centrifugal force F is easily reduced by controlling the rotational speed difference in accordance with the tilt of the vehicle body.

The above embodiment has described the example where the controller 6 determines the upper limit value P1 of the target rotational speed difference P based on the result evaluated by the sensory evaluation by the driver and sets the command rotational speed of the outer drive wheel 42, but the present disclosure is not limited thereto. For example, the upper limit value P1 may be set in accordance with the tilt of the traveling road surface in the vehicle body width direction of the vehicle 1.

With this configuration, the overturning of the vehicle 1 caused due to the centrifugal force F is easily reduced by controlling the rotational speed difference in accordance with the tilt of the traveling road surface. For example, in a case where the traveling road surface is tilted so as to be lowered from the inner-wheel-side toward the outer-wheel-side at the time of turning, overturning occurs more easily than in a case where the traveling road surface is flat. However, the overturning is reduced by setting the upper limit value P1 to be smaller than that in a case where the traveling road surface is flat. Further, in a case where the traveling road surface is tilted so as to be high from the inner-wheel-side toward the outer-wheel-side at the time of turning, overturning occurs more difficultly than in the case where the traveling road surface is flat. However, a reduction of the turning speed can be reduced by setting the upper limit value P1 to be greater than in the case where the traveling road surface is flat.

The above embodiment has described the example where the controller 6 determines the upper limit value P1 of the target rotational speed difference P based on the result evaluated by the sensory evaluation by the driver and sets the command rotational speed of the outer drive wheel 42, but the present disclosure is not limited thereto. For example, the vehicle 1 may include the load weight detector 79 for detecting the weight of the load, and may set the upper limit value P1 in accordance with the weight of the load detected by the load weight detector 79.

With this configuration, since the command rotational speed difference can be controlled in accordance with the weight of the vehicle 1, for example, even in a case where the weight of the vehicle 1 changes depending on the weight of the driver or the weight of the load, the centrifugal force F can be controlled, and the overturning of the vehicle 1 can be reduced more easily.

The above embodiment has described the configuration where the vehicle 1 includes the selector 80, but the present disclosure is not limited thereto, and the vehicle 1 may not include the selector 80.

What is claimed is:

1. A vehicle comprising:
a vehicle body;
a drive source provided in the vehicle body;
a left drive wheel and a right drive wheel that receive a drive force from the drive source, are supported by the vehicle body, and are rotationally controlled independently of each other;
left and right manipulators that are operated by an operator to control rotational speed of the left drive wheel and the right drive wheel, respectively; and
a controller configured to
calculate a first target parameter and a second target parameter based on operation information about the left and right manipulators, the first target parameter being related to a target rotational speed of the left drive wheel, the second target parameter being related to a target rotational speed of the right drive wheel,
calculate a left command rotational speed output to the left drive wheel and a right command rotational speed output to the right drive wheel based on a target rotational speed difference that is a difference between the first target parameter and the second target parameter, and
control the left drive wheel with the left command rotational speed and the right drive wheel with the right command rotational speed,
wherein the controller is further configured to
set the left command rotational speed to the target rotational speed of the left drive wheel and set the right command rotational speed to the target rotational speed of the right drive wheel when the target rotational speed difference is equal to or less than a predetermined value, and
when the target rotational speed difference exceeds the predetermined value, set one of the left command rotational speed and the right command rotational speed to a rotational speed that is different from the target rotational speed of one of the left drive wheel and the right drive wheel which corresponds to the one of the left command rotational speed and the right command rotational speed so that a command rotational speed difference becomes the predetermined value, the command rotational speed difference being a difference between a first command parameter related to the left command rotational speed and a second command parameter related to the right command rotational speed.

2. The vehicle according to claim 1, wherein one of the left drive wheel and the right drive wheel is an outer drive wheel which is positioned on an outer-wheel-side during turning, and the controller reduces a command rotational speed of the outer drive wheel so that the command rotational speed is lower than the target rotational speed of the one of the left drive wheel and the right drive wheel when the target rotational speed difference exceeds the predetermined value.

3. The vehicle according to claim 2, wherein the other of the left drive wheel and the right drive wheel is an inner drive wheel which is positioned on an inner-wheel-side during turning, and the controller sets a command rotational speed of the inner drive wheel so that the command rotational speed is identical to the target rotational speed of the other of the left drive wheel and the right drive wheel when the target rotational speed difference exceeds the predetermined value.

4. The vehicle according to claim 1, wherein the first target parameter is a power of the target rotational speed of the left drive wheel, the second target parameter is a power of the target rotational speed of the right drive wheel, the first command parameter is a power of the left command rotational speed, and the second command parameter is a power of the right command rotational speed.

5. The vehicle according to claim 4, wherein the power is square.

6. The vehicle according to claim 1, wherein one of the left drive wheel and the right drive wheel is an inner drive wheel which is positioned on a radial inside during turning and the other of the left drive wheel and the right drive wheel is an outer drive wheel which is positioned on a radial outside during turning, wherein the controller controls the left and right drive wheels so that a command rotational speed difference between the inner drive wheel and the outer drive wheel decreases while a target rotational speed of the inner drive wheel approaches a target rotational speed of the outer drive wheel.

7. The vehicle according to claim 1, wherein the operation information includes operation amounts of the right and left manipulators or time variation of change of the operation amounts.

8. The vehicle according to claim 1, wherein the controller sets the predetermined value in accordance with a vehicle speed.

9. The vehicle according to claim 1, wherein the controller sets the predetermined value in accordance with a vehicle body tilt in a vehicle body width direction of the vehicle.

10. The vehicle according to claim 1, wherein the controller sets the predetermined value in accordance with a tilt of a traveling road surface in a vehicle body width direction of the vehicle.

11. The vehicle according to claim 1, further comprising a load weight detector that detects a weight of a load,
wherein the controller sets the predetermined value in accordance with the weight of the load detected by the load weight detector.

12. The vehicle according to claim 1, further comprising a selector that enables switching between a reduction mode in which the predetermined value is set and a reduction release mode in which the predetermined value is not set.

13. The vehicle according to claim 1, wherein the vehicle includes a lawn mower.

14. A traveling control method for a vehicle, the vehicle including
a vehicle body,
a drive source provided in the vehicle body,
a left drive wheel and a right drive wheel that receive a drive force from the drive source, are supported by the vehicle body, and are rotationally controlled independently of each other,
left and right manipulators that are operated by an operator to control rotational speed of the left drive wheel and the right drive wheel, respectively, and
a controller that calculates a first target parameter and a second target parameter based on operation information about the left and right manipulators, the first target parameter being related to a target rotational speed of the left drive wheel, the second target parameter being related to a target rotational speed of the right drive wheel, calculates a left command rotational speed output to the left drive wheel and a right command rotational speed output to the right drive wheel based on a target rotational speed difference that is a difference between the first target parameter and the second target parameter, and controls the left drive wheel with the left command rotational speed and the right drive wheel with the right command rotational speed,
wherein the controller
sets the left command rotational speed to the target rotational speed of the left drive wheel and the right command rotational speed to the target rotational speed of the right drive wheel when the target rotational speed difference is equal to or less than a predetermined value, and
when the target rotational speed difference exceeds the predetermined value, sets one of the left command rotational speed and the right command rotational speed to a rotational speed that is different from the target rotational speed of one of the left drive wheel and the right drive wheel which corresponds to the one of the left command rotational speed and the right command rotational speed so that a command rotational speed difference becomes the predetermined value, the command rotational speed difference being a difference between a first command parameter related to the left command rotational speed and a second command parameter related to the right command rotational speed.

* * * * *